US011341015B2

(12) United States Patent
Murphy et al.

(10) Patent No.: US 11,341,015 B2
(45) Date of Patent: May 24, 2022

(54) UART RECEIVER WITH ADAPTIVE SAMPLE TIMING CONTROL USING A NUMERICALLY-CONTROLLED OSCILLATOR

(71) Applicant: TEXAS INSTRUMENTS INCORPORATED, Dallas, TX (US)

(72) Inventors: Timothy Murphy, Ramona, CA (US); Srinadh Madhavapeddi, Dallas, TX (US); Terry Lee Sculley, Lewisville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 57 days.

(21) Appl. No.: 16/588,449

(22) Filed: Sep. 30, 2019

(65) Prior Publication Data

US 2021/0096969 A1   Apr. 1, 2021

(51) Int. Cl.
| | |
|---|---|
| *G06F 11/00* | (2006.01) |
| *G06F 11/30* | (2006.01) |
| *G06F 11/22* | (2006.01) |
| *G06F 11/07* | (2006.01) |
| *G06F 11/20* | (2006.01) |

(52) U.S. Cl.
CPC ........ *G06F 11/3058* (2013.01); *G06F 11/076* (2013.01); *G06F 11/2074* (2013.01); *G06F 11/221* (2013.01)

(58) Field of Classification Search
CPC .. G06F 11/221; G06F 11/076; G06F 11/2074; G06F 11/3058; G06F 11/3062
See application file for complete search history.

(56) References Cited

U.S. PATENT DOCUMENTS

| | | | |
|---|---|---|---|
| 6,937,683 B1 * | 8/2005 | Ratzel ................ | H03L 7/06 327/159 |
| 2010/0259221 A1 * | 10/2010 | Tabatowski-Bush ... | B60L 58/18 320/134 |
| 2011/0182391 A1 * | 7/2011 | Feller ................ | H04L 7/0029 375/371 |
| 2013/0304947 A1 * | 11/2013 | Wada ................ | G06F 11/3048 710/18 |
| 2014/0232474 A1 * | 8/2014 | Walters ............. | H03K 3/72 331/25 |
| 2017/0277245 A1 * | 9/2017 | Paley ................ | G06F 1/30 |

* cited by examiner

*Primary Examiner* — Joseph D Manoskey
(74) *Attorney, Agent, or Firm* — Ray A. King; Charles A. Brill; Frank D. Cimino

(57) ABSTRACT

A system includes a battery and a monitoring circuit coupled to the battery. The monitoring circuit includes a sense circuit and a peripheral device coupled to the sense circuit. The peripheral device includes a universal asynchronous receiver-transmitter (UART) receiver having an adaptive sample timing circuit with a numerically-controlled oscillator (NCO) circuit. The peripheral device also includes memory coupled to the UART receiver and configured to store battery monitoring data.

21 Claims, 8 Drawing Sheets

UART RECEIVER WITH ADAPTIVE SAMPLE TIMING CONTROL USING A NUMERICALLY-CONTROLLED OSCILLATOR

BACKGROUND

Universal asynchronous receiver-transmitter (UART) links are inherently asynchronous in their operation. Transmitter (TX) and receiver (RX) ends of a UART link could have frequency error between them due to local clock generation differences (e.g., crystal or other local oscillator variations). Also, a system clock and baud rate could be related by a non-integer relationship. There could thus be bit errors in the cumulative error from TX/RX frequency offset and in the system clock to baud rate fractional relationship.

SUMMARY

In accordance with at least one example of the disclosure, a system comprises a battery and a monitoring circuit coupled to the battery. The monitoring circuit comprises a sense circuit and a peripheral device coupled to the sense circuit. The peripheral device comprises a universal asynchronous receiver-transmitter (UART) receiver having an adaptive sample timing circuit with a numerically-controlled oscillator (NCO) circuit. The peripheral device also comprises memory coupled to the UART receiver and configured to store battery monitoring data.

In accordance with at least one example of the disclosure, a UART receiver comprises an NCO circuit and a clock count circuit coupled to a first input node of the NCO circuit. The UART receiver also comprises a bit count circuit coupled to a second input node of the NCO circuit, wherein an output of the NCO circuit determines a sample time for the UART receiver.

In accordance with at least one example of the disclosure, an integrated circuit comprises a UART transmitter, a UART receiver, and memory coupled to the UART transmitter and the UART receiver. The UART receiver comprises an NCO circuit configured to change a sample time for the UART receiver based at least in part on an accumulated clock count value and an accumulated bit count value.

BRIEF DESCRIPTION OF THE DRAWINGS

For a detailed description of various examples, reference will now be made to the accompanying drawings in which.

DETAILED DESCRIPTION

Figure 1:
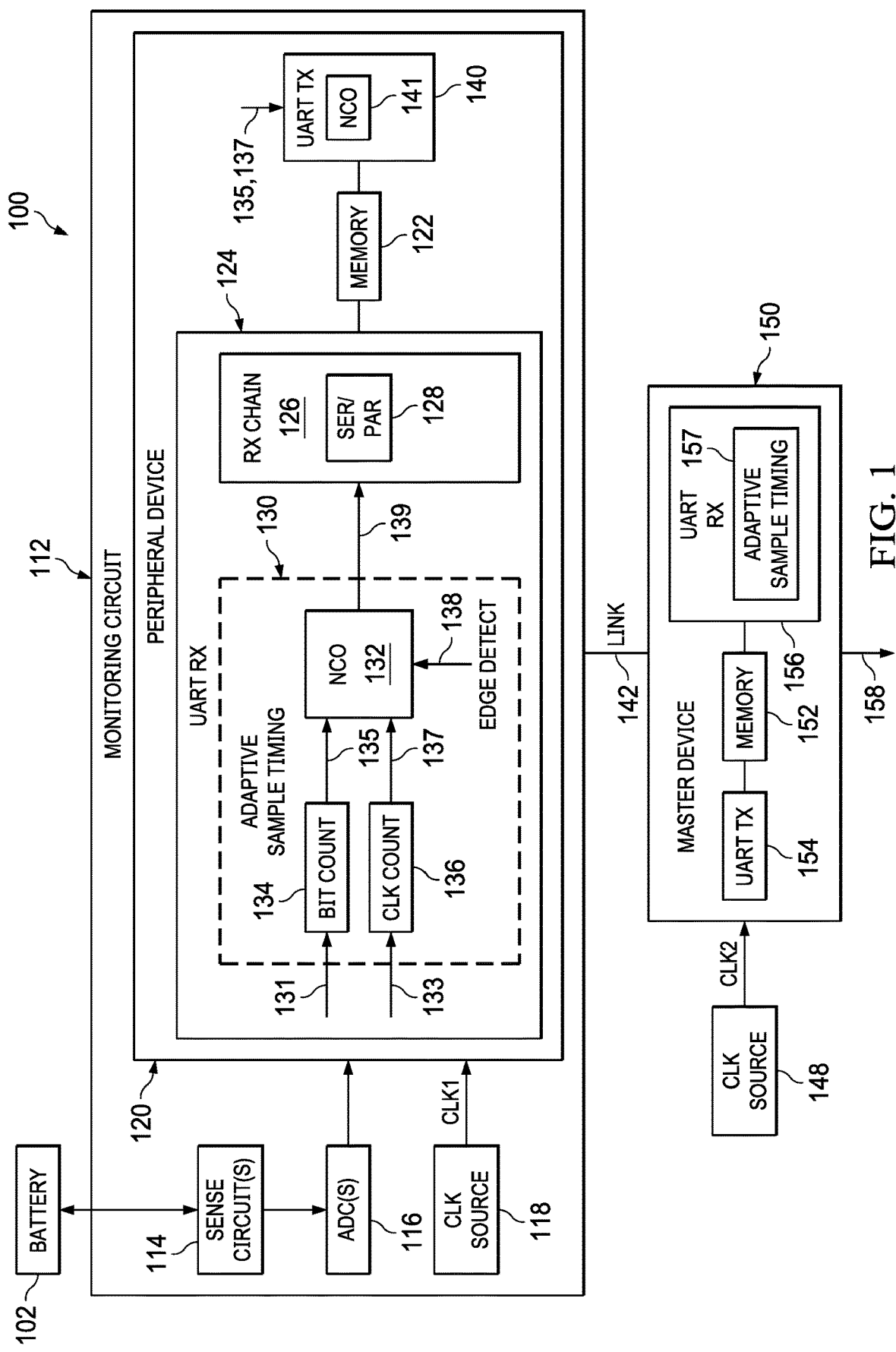
FIG. 1 is a block diagram showing a system in accordance with various examples.

Described herein are universal asynchronous receiver-transmitter (UART) device topologies with adaptive sample timing using a numerically-controlled oscillator (NCO) circuit. In the disclosed examples, adaptive sample timing in a UART device involves providing an accumulated bit count value and an accumulated clock count value as inputs to an NCO circuit. For example, the accumulated bit count value may be provided by a bit count circuit, while the accumulated clock count value is provided by a clock count circuit. To account for count overflows the bit count circuit is configured to divide the accumulated bit count value in response to a received data edge along with an accumulated bit count overflow trigger or accumulated clock count overflow trigger. Also, the clock count circuit is configured to divide the accumulated clock count value in response to a received data edge along with an accumulated bit count overflow trigger or accumulated clock count overflow trigger. With the accumulated clock count value, the accumulated bit count value, and received data edge detect information, an NCO circuit is able to adjust the received data sample timing for a UART receiver without a pre-defined training pattern.

In one example, a UART receiver with adaptive sample timing is part of a monitoring circuit for a battery. The battery may be part of an electrical system, where the voltage, current, and/or status of the battery is being monitored. For example, the monitoring circuit may include a sense circuit and a peripheral device coupled to the sense circuit. The peripheral device includes a UART receiver with an adaptive sample timing circuit, where the adaptive sampling timing circuit includes an NCO circuit. The peripheral device also may include memory coupled to the UART receiver, where the memory is configured to store battery monitoring data. In some examples, the adaptive sample timing circuit includes a clock count circuit and a bit count circuit coupled to the NCO circuit. Again, the clock count circuit provides an accumulated clock count value to the NCO circuit, while the bit count circuit provides an accumulated bit count value to the NCO circuit. With the accumulated clock count value, the accumulated bit count value, and received data edge detect information, the NCO circuit is able to adjust the sample timing for a UART receiver without need of a training algorithm or pre-defined training pattern (i.e., unpatterned data edges are used to train the NCO circuit). In some examples, a rising edge and a falling edge in the received data are used to adjust or train the sample timing of an adaptive sample timing circuit. In other examples, only falling edges in the received data are used to adjust or train the sample timing of an adaptive sample timing circuit to avoid errors due to rise/fall time differences. Also, in some examples, the information tracked by an adaptive sample timing circuit (e.g., the accumulated bit count and the accumulated clock count) may be provided from a UART receiver to a UART transmitter (e.g., to the transmitter's NCO) to facilitate the timing of subsequent transmissions by the UART transmitter. To provide a better understanding, various options for adaptive sample timing in a UART are described using the figures as follows.

FIG. 1 is a block diagram showing a system 100 in accordance with various examples. As shown, the system 100 includes a battery 102 coupled to a monitoring circuit 112. In the example of FIG. 1, the monitoring circuit 112 includes sense circuit(s) 114 coupled to ADC(s) 116. The sense circuit 114 is configured to monitor a voltage level and/or a current level associated with the battery 102. The sense values and/or status values determined by the sense circuit(s) 114 are provided to a peripheral device 120. In some examples, the ADC(s) 116 digitizes the sense values and/or status values for storage in a memory module 122 of the peripheral device 120. In other words, the memory module 122 stores battery monitoring information obtained using the sense circuit(s) 114 for later access or transfer. In some examples, the memory module 122 corresponds to random access memory (RAM). In other examples, the memory module 122 corresponds to registers. In some examples, the monitoring circuit 112 may include an on-chip processor that writes between a main memory and registers included with a UART transmitter and/or a UART receiver. Without limitation to other examples, in the example of FIG. 1, the peripheral device 120 includes a UART transmitter 140 and a UART receiver 124 coupled to the memory module 122, where a clock signal (CLK1) from a clock source 118 is used for transmit operations, receive operations, and/or other operations of the peripheral device 120.

In the example of FIG. 1, the UART receiver 124 includes an adaptive sample timing circuit 130 coupled to a receiver chain 126. In operation, the adaptive sample timing circuit 130 provides sample timing information 139 to the receiver chain 126, which uses the sample timing information 139 to sample received data and to perform other operations. For example, the receiver chain 126 includes a serial-to-parallel interface 128, which converts sampled receive data from a serial data stream to a parallel data stream.

As shown, the adaptive sample timing circuit 130 includes an NCO circuit 132 coupled to a bit count circuit 134 and to a clock count circuit 136. The bit count circuit 134 is configured to provide an accumulated bit count value 135 to the NCO circuit 132. The clock count circuit 136 is configured to provide an accumulated clock count value 137 to the NCO circuit 132. The NCO circuit 132 also receives an edge detect signal 138. For example, the edge detect signal 138 may be provided by an edge detect circuit (e.g., with latches and gates) configured to indicate rising edges and falling edges of a RX UART signal. In some examples, the NCO circuit 132 uses the accumulated bit count value 135, the accumulated clock count value 137, and the edge detect signal 138 to determine the sample timing information 139. During operations of the NCO circuit 132, the bit count circuit 134, the clock count circuit 136, and the NCO circuit 132 are able to account for count overflows by division (e.g., by division of the accumulated bit count value by 2, by division of the accumulated clock count value by 2, by division of a next accumulated clock count by 2, and by division of a next accumulated bit count by 2). In some examples, the UART transmitter 140 includes an NCO circuit 141, which receives the accumulated bit count value 135 and the accumulated clock count value 137 from the adaptive sample timing circuit 130 of the UART receiver 124.

In the example of FIG. 1, the peripheral device 120 is coupled to a master device 150 via a UART link 142. As shown, the master device 150 includes a UART transmitter 154 and a UART receiver 156 coupled to a memory module 152, where a clock signal (CLK2) from a clock source 148 is used for transmit operations, receive operations, and/or other operations of the master device 150. In the system 100, the clock source 118 associated with the peripheral device 120 and the clock source 148 associated with the master device 150 are different and introduce some timing variation, which could result in sampling errors. Accordingly, the adaptive sample timing circuit 130 of the UART receiver 124 is intended to account for such timing variations as described herein. Also, in some examples, the UART receiver 156 of the master device 150 includes an adaptive sample timing circuit 157 to account for such timing variations.

In some examples, the memory module 152 of the master device 150 stores battery monitoring information obtained from the peripheral device 120 for later use. In some examples, the memory module 152 corresponds to RAM. In some examples, the UART transmitter 154 of the master device 150 is configured to transmit data or requests to the UART receiver 124 of the peripheral device 120. For example, the UART transmitter 154 of the master device 150 may send a request (e.g., for battery monitoring information) to the UART receiver 124 of the peripheral device 120 via the UART link 142. In response, the UART transmitter 140 of the peripheral device 120 may convey a response to the request (e.g., battery monitoring information stored by the memory module 122) to the UART receiver 156 of the master device 150 via the UART link 142.

In some examples, the information being tracked by the adaptive sample timing circuit 130 (e.g., the accumulated bit count value 135, the accumulated clock count value 137, the sample timing information 139) may be provided to the master device 150 for use by the UART transmitter 154. Also, it should be appreciated that the adaptive sample timing circuit 130 is configured to use available framing information (e.g., the number of bits from a start bit to a stop bit, or whether there is even/odd or no parity bit from the start bit to the stop bit) for UART communications. The framing information and nominal bit rate are agreed upon before UART communications are initiated.

Figure 2:
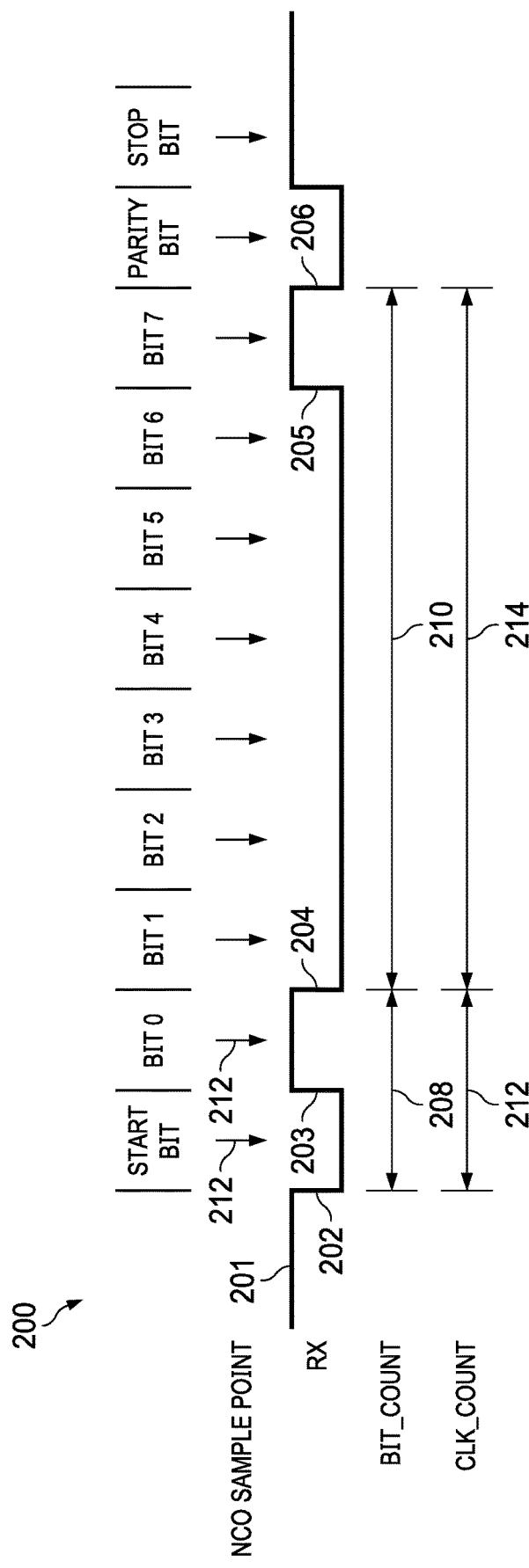
FIG. 2 is a timing diagram showing a universal asynchronous receiver-transmitter (UART) receiver signals and related intervals in accordance with various examples.

FIG. 2 is a timing diagram 200 showing a UART receiver signal and related intervals in accordance with various examples. In the timing diagram 200, NCO sample points 212 are represented relative to a received signal 201 that includes a START bit, 8 data bits, a parity bit, and a STOP bit. In the received signal 201 various data edge transitions are represented including falling edge 202 at the beginning of the START bit, rising edge 203 at the start of bit 0, a falling edge 204 at the end of bit 0, a rising edge 205 at the beginning of bit 7, and a falling edge 206 at the end of bit 7. In the timing diagram 200, a bit count interval 208 between falling edges 202 and 204 is represented. Also, a clock count interval 212 between falling edges 202 and 204 is represented, where the bit count interval 208 and the clock count interval 212 have the same length. Between the falling edges 204 and 206 is another bit count interval 210 and another clock count interval 214.

In some examples, the bit count interval 208 and the clock count interval 212 are used to determine the bit period, which can be used to train an NCO circuit (e.g., the NCO circuit 132 in FIG. 1). For example, the bit period may be calculated as $$\frac{\text{clock period} * \text{clock count}}{\text{bit count}},$$

and more accurately as $$\frac{\text{clock period} * \sum \text{clock count}}{\sum \text{bit count}}.$$

Additionally or alternatively, the bit count interval 212 and the clock count interval 214 may be used to determine the bit period and to train an NCO circuit. Additionally or alternatively, one or more of the rising edges 203 and 205 may be used to determine the bit period and to train an NCO circuit. In one example, a falling edge followed by a rising edge is used to determine the bit period. Once the bit period is known, the sample timing strategy involves selecting a sample time at the center of the pit period. In the disclosed examples, an NCO circuit is used to adjust a sample time using an accumulated bit count value, an accumulated clock count value, and edge information.

Figure 3:
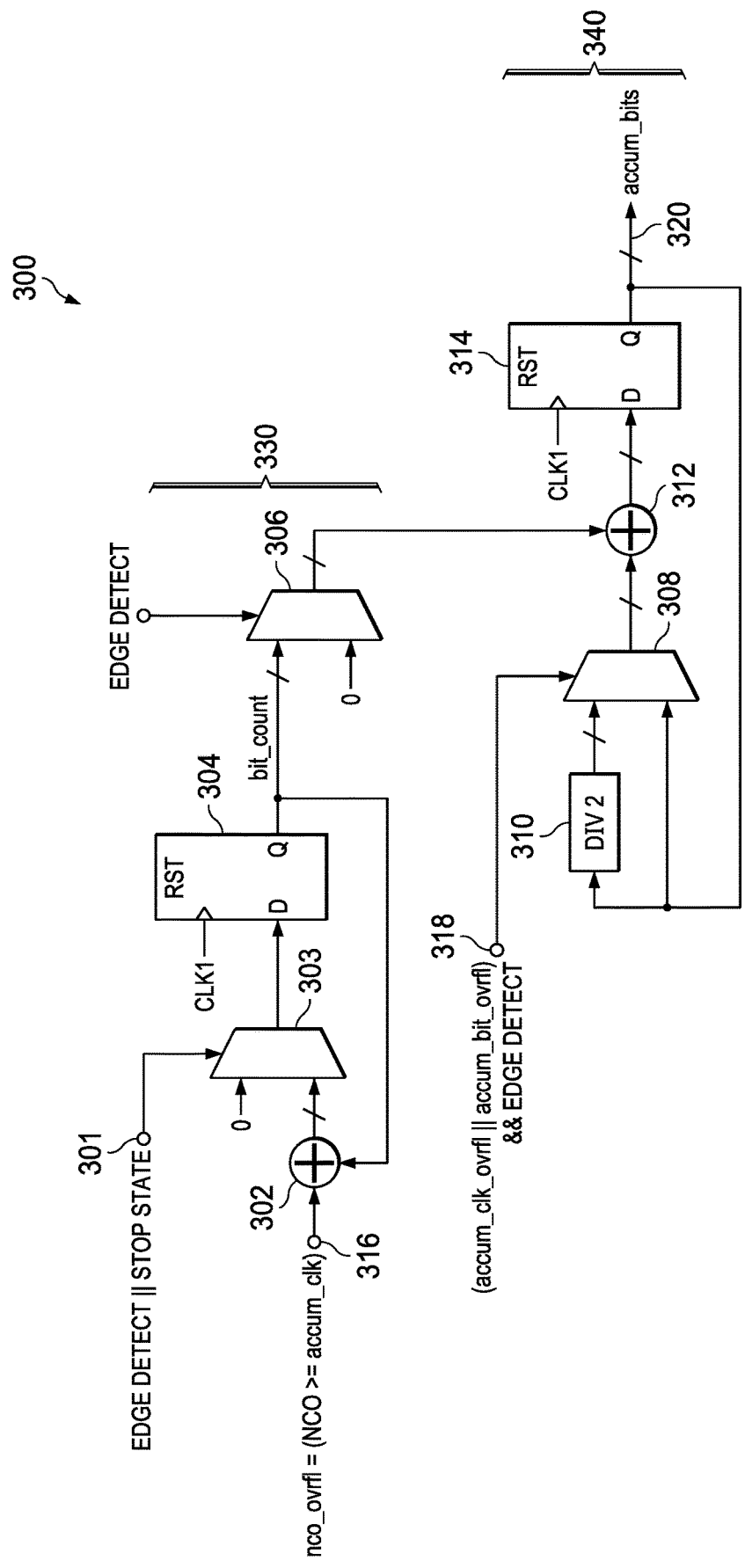
FIG. 3 is a schematic diagram showing a bit count circuit for a UART receiver in accordance with various examples.

FIG. 3 is a schematic diagram showing a bit count circuit 300 (an example of the bit count circuit 134 in FIG. 1) for a UART receiver (e.g., the UART receiver 124 of FIG. 1) in accordance with various examples. As shown, the bit count circuit 300 comprises a first set of components 330 configured to provide a bit count value (bit_count) relative to the latest data edge. The bit count circuit 300 also comprises a second set of components 340 configured to track an accumulated bit count value (accum_bits) over multiple data edges (accum_bits=a first bit_count from first data edge to a second data edge+a second bit_count from the second data edge to a third data edge, and so on). In the example of FIG. 3, the second set of components 340 also divides accum_bits as needed to maintain the value of accum_bits below an overflow value. As explained in greater detail in FIG. 5, accum_bits is used by an NCO.

More specifically, in the example of FIG. 3, the first set of components 330 include an increment circuit 302, a first multiplexer 303, a D latch 304, and a second multiplexer 306. In operation, the D latch 304 is clocked by a clock signal (e.g., CLK1 in FIG. 1) and is configured to output a bit count value (bit_count), where bit_count tracks the number of bits after an edge has been detected. The input to the D latch 304 is the output of the first multiplexer 303. The inputs to the first multiplexer 303 include a null value and the output of the increment circuit 302. As represented in FIG. 3, the control signal for the first multiplexer 303 is Edge Detect || STOP State, which means that both an Edge Detect signal and a STOP State signal control the multiplexer 303. When the STOP state signal and the Edge Detect signal are low, the output of the first multiplexer 303 is the output of the increment circuit 302. Otherwise, when either the STOP state signal or the Edge Detect signal is high, the output of the first multiplexer 303 is the null value (counting is paused). In some examples, the STOP state signal is asserted in response to receiving a UART STOP bit, and the STOP state signal stays asserted until the falling edge of the next START bit. In the example of FIG. 3, the D latch 304 is configured to output the value provided by the first multiplexer 303 as bit_count at a rate determined by CLK1.

As shown, the inputs to the increment circuit 302 include the output of the D latch 304 and an NCO overflow signal (nco_ovrfl) received from node 316 indicating an NCO overflow condition. In the example of FIG. 3, the value of nco_ovrfl is high when the NCO value+the accumulated bits value (accum_bits)>=an accumulated clock count value (accum_clks). The output of the D latch 304 is provided to the second multiplexer 306, which is controlled by Edge Detect. When the Edge Detect signal is low, the second multiplexer 306 outputs a null value. Otherwise, when the Edge Detect signal is high, the second multiplexer 306 outputs the bit_count value provided by the D latch 304. To summarize, the function of the first set of components 330 is to provide a bit count starting at each data edge. When a next data edge is detected, the first set of components outputs the current bit count value (bit_count) and starts a new bit count. Also, the bit count process may be enabled or paused using the STOP state signal as described herein. With the STOP state signal asserted, the bit count is not updated following a STOP bit until the next START bit is detected.

In the example of FIG. 3, the output of the second multiplexer 306 of the first set of components 330 is provided to an adder circuit 312 of the second set of components 340. The second set of components 340 also include a multiplexer 308, a divider circuit 310, and a D latch 314. As shown, the other input to the adder circuit 312 is the output of the multiplexer 308. The inputs to the multiplexer 308 include an accumulated bit count (accum_bits) and a divided accum_bits value (e.g., accum_bits/2) provided by the divider circuit 310 coupled between the multiplexer 308 and the D latch 314. As shown, the D latch 314 is coupled to an output of the adder circuit 312 and is clocked by CLK1. In the example of FIG. 3, the divided accumulated bit count value (e.g., accum_bits/2) is output from the multiplexer 308 in response to an Edge Detect signal (from control node 318) along with an accumulated bit overflow condition (accum_bit_ovrfl) or an accumulated clock overflow condition (accum_clk_ovrfl). Thus, in the example of FIG. 3, the adder circuit 312 adds the output of the multiplexer 308 to the value of accum_bits output from the D latch 314 unless the Edge Detect signal goes high along with one of accum_bit_ovrfl or accum_clk_ovrfl. In such case, the output of the multiplexer 308 is accum_bits/2.

With the bit count circuit 300, the number of bits relative to a data edge is tracked as accum_bits. This value is provided to an NCO circuit (e.g., the NCO circuit 132 in FIG. 1) to enable the NCO circuit to adjust a sample time. As needed, the accum_bits value is divided (e.g., by 2) due to an overflow condition (e.g., the accum_bits value or accum_clks value reaches a threshold near or at a respective maximum memory capacity assigned to store counts). In some examples, when a most significant bit of a memory or register capacity is reached, the overflow condition is triggered.

Figure 4:
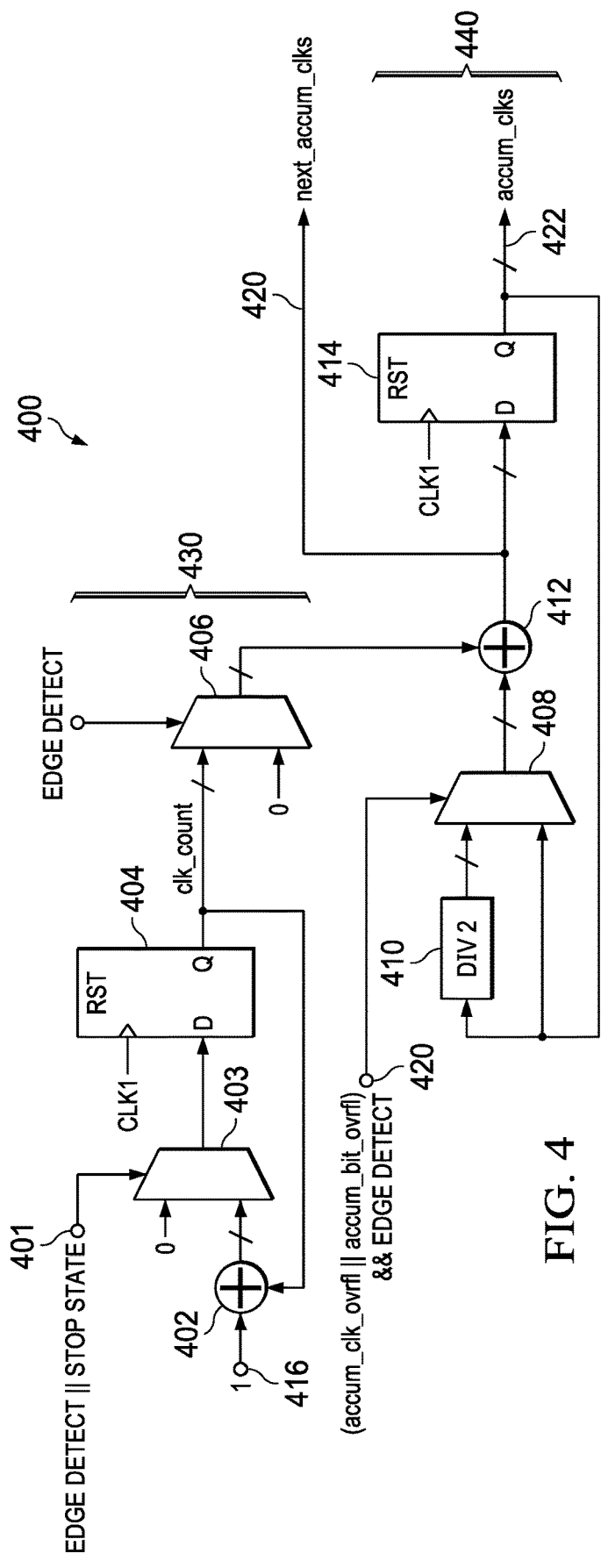
FIG. 4 is a schematic diagram showing a clock count circuit for a UART receiver in accordance with various examples.

FIG. 4 is a schematic diagram showing a clock count circuit 400 (e.g., the clock count circuit 136 in FIG. 1) for a UART receiver (e.g., the UART receiver 124 in FIG. 1) in accordance with various examples. As shown, the clock count circuit 400 comprises a first set of components 430 configured to provide a clock count value (clk_count) relative to the latest data edge. The clock count circuit 400 also comprises a second set of components 440 configured to track an accumulated clock count value (accum_clks) over multiple data edges (accum_clks=a first clk_count from first data edge to a second data edge+a second clk_count from the second data edge to a third data edge, and so on). In the example of FIG. 4, the second set of components 440 also divides accum_clks as needed to maintain the value of accum_clks below an overflow value. In the example of FIG. 4, the second set of components 440 also provides a next accumulated clock count value (next_accum_clks). As explained is greater detail in FIG. 5, accum_clks and next_accum_clks are used by an NCO circuit (e.g., the NCO circuit 500).

More specifically, in the example of FIG. 4, the first set of components 430 include an increment circuit 402, a first multiplexer 403, a D latch 404, and a second multiplexer 406. In operation, the D latch 404 is clocked by a clock signal (e.g., CLK1 in FIG. 1) and is configured to output a clock count (clk_count) value (clk_count), where clk_count tracks the number of clock periods of CLK1 that occur after a data edge has been detected. The input to the D latch 404 is the output of the first multiplexer 403. The inputs to the first multiplexer 403 include a null value and the output of the increment circuit 402. As represented in FIG. 4, the control signal for the first multiplexer 403 is Edge Detect ∥ STOP State, which means that both an Edge Detect signal and a STOP State signal control the multiplexer 403. When the STOP state signal and the Edge Detect signal are low, the output of the first multiplexer 403 is the output of the increment circuit 402. Otherwise, when either the STOP state signal or the Edge Detect signal is high, the output of the first multiplexer 403 is the null value (counting is paused). In some examples, the STOP state signal is asserted in response to receiving a UART STOP bit, and the STOP state signal stays asserted until the falling edge of the next START bit. In the example of FIG. 4, the D latch 404 is configured to output the value provided by the first multiplexer 403 as clk_count at a rate determined by CLK1.

As shown, the inputs to the increment circuit 402 include the output of the D latch 404 and "1" value received from node 416. The output of the D latch 404 is provided to the second multiplexer 406, which is controlled by the edge detect signal. When the Edge Detect signal is low, the second multiplexer 406 outputs a null value. Otherwise, when the Edge Detect signal is high, the second multiplexer 406 outputs the clk_count value provided by the D latch 404. To summarize, the function of the first set of components 430 is to provide a clock count starting at each data edge. When a next data edge is received, the first set of components 430 outputs the current clock count value (clk_count) and starts a new clock count.

In the example of FIG. 4, the output of the second multiplexer 406 of the first set of components 430 is provided to an adder circuit 412 of the second set of components 440. The second set of components 440 also include a multiplexer 408, the divider circuit 410, and a D latch 414. As shown, the other input to the adder circuit 412 is the output of the multiplexer 408. The inputs to the multiplexer 408 include an accumulated clock count (accum_clks) and a divided accum_clks value (e.g., accum_clks/2) provided by the divider circuit 410 coupled between the multiplexer 408 and the D latch 414. As shown, the D latch 414 is coupled to an output of the adder circuit 412 and is clocked by CLK1. In the example of FIG. 4, the divided accumulated clock count value (e.g., accum_clks/2) is output from the multiplexer 408 in response to an edge detect signal (from control node 420) along with an accumulated bit overflow condition (accum_bit_ovrfl) or an accumulated clock overflow condition (accum_clk_ovrfl). Thus, in the example of FIG. 4, the adder circuit 412 adds the output of the multiplexer 408 to the value of accum_clks output from the D latch 414 unless the edge detect signal goes high along with one of accum_bit_ovrfl or accum_clk_ovrfl. In such case, the output of the multiplexer 408 is accum_clks/2.

With the clock count circuit 400, the number of clock periods relative to a data edge is tracked as accum_clks. This value is provided to an NCO circuit (e.g., the NCO circuit 132 in FIG. 1) to enable the NCO circuit to adjust a sample time. As needed, the accum_clks value is divided (e.g., by 2) due to an overflow condition (e.g., the accum_bits count or accum_clks count reaches a threshold near or at a respective maximum memory capacity assigned to store counts). In some examples, when a most significant bit of a memory or register capacity is reached, an overflow condition is triggered.

Figure 5:
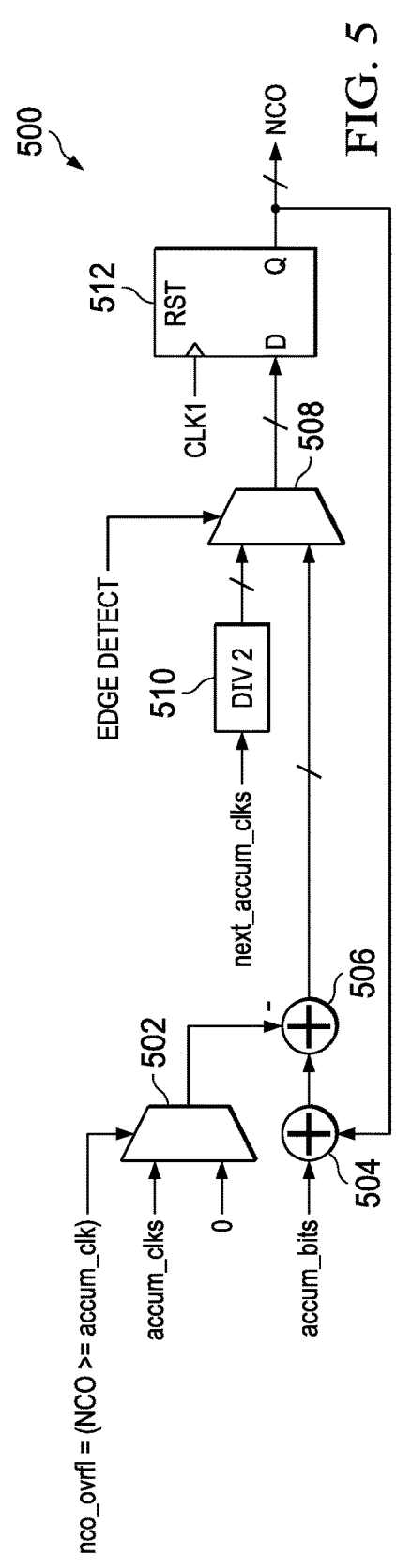
FIG. 5 is a schematic diagram showing a numerically-controlled oscillator (NCO) circuit for a UART receiver in accordance with various examples.

FIG. 5 is a schematic diagram showing an NCO circuit 500 (an example of the NCO circuit 132 in FIG. 1) for a UART receiver (e.g., the UART receiver 124 in FIG. 1) in accordance with various examples. As shown, the NCO circuit 500 comprises a multiplexer 502 that receives an accumulated clock count value (e.g., accum_clks) and a null value as inputs. The control signal for the multiplexer 502 is an NCO overflow condition (nco_ovrfl). In some examples, the nco_ovrfl is high ("true") when an NCO value>=accum_clks. When nco_ovrfl is high, the accum_clks value is output by the multiplexer 502. Otherwise, when nco_ovrfl is low ("false"), the null value is output by the multiplexer 502. The output of the multiplexer 502 is input to a combine circuit 506. In the example of FIG. 5, the combine circuit 506 subtracts accum_clks or the null value from the output of another combine circuit 504. As shown, the combine circuit 504 combines an accumulated bit count value (e.g., accum_bits) with an NCO value. The output of the combine circuit 506 is one of the inputs to a multiplexer 508. As shown, the other input to the multiplexer 508 is a divided version of a next accumulated clock count value (e.g., next_accum_clks). More specifically, in the example of FIG. 5, a divider 510 configured to divide by 2 is used such that the other input to the multiplexer 508 next_accum_clks/2. The control signal for the multiplexer 508 is an edge detect signal ("Edge Detect"). When the Edge Detect signal is low, the output of the combine circuit 506 (e.g., NCO+accum_bits or NCO+accum_bits−accum_clks) is output from the multiplexer 508. When the Edge Detect signal is high, next_accum_clks/2 is output from the multiplexer 508. The output of the multiplexer 508 is input to a latch circuit 512 (e.g., a D latch), where the latch circuit is clocked by a clock signal (e.g., CLK1 in FIG. 1). The output of the latch circuit 512 is the NCO value. When the NCO value reaches a predetermined threshold, receive data sampling is performed.

Figure 6:
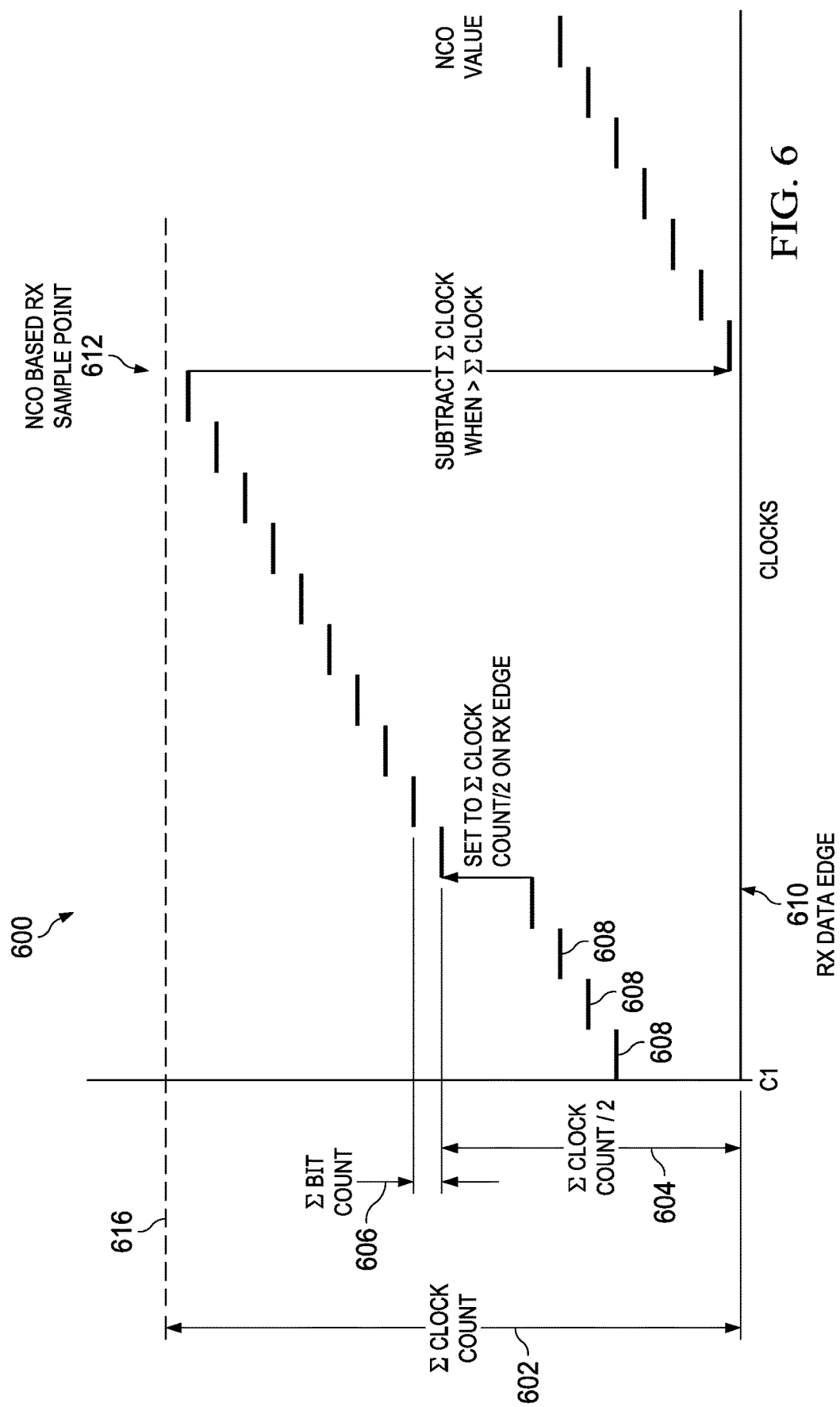
FIG. 6 is a timing diagram showing NCO operations to select a UART receiver sample time in accordance with various examples.

FIG. 6 is a timing diagram 600 showing NCO operations (e.g., related to the NCO circuit 132 in FIG. 1, or the NCO circuit 500 in FIG. 5) to select a UART receiver (e.g., the UART receiver 124 in FIG. 1) sample time in accordance with various examples. In the timing diagram 600, NCO values 608 are represented as a function of clock periods. As shown, the NCO value may be a non-zero value at a given clock period (C1). Thereafter, the NCO value begins to increase for every clock period. During NCO operations, a receive data edge 610 is used to set the divided accumulated clock count value (e.g., $$\left(e.g., \frac{\sum \text{CLOCK COUNT}}{2}\right), \text{ where } \frac{\sum \text{CLOCK COUNT}}{2}$$

is represented by the value 604 in FIG. 6. Also, an accumulated bit count value (ΣBIT COUNT) is represented by the value 606 in FIG. 6. Also, an accumulated clock count value (ΣCLOCK COUNT) is represented by the value 602 in FIG. 6. When the NCO value reaches a threshold 616 (ΣCLOCK COUNT), a received data sample point 612 is selected, the value 602 for ΣCLOCK COUNT is subtracted from the NCO value, and the process continues.

Figure 7:
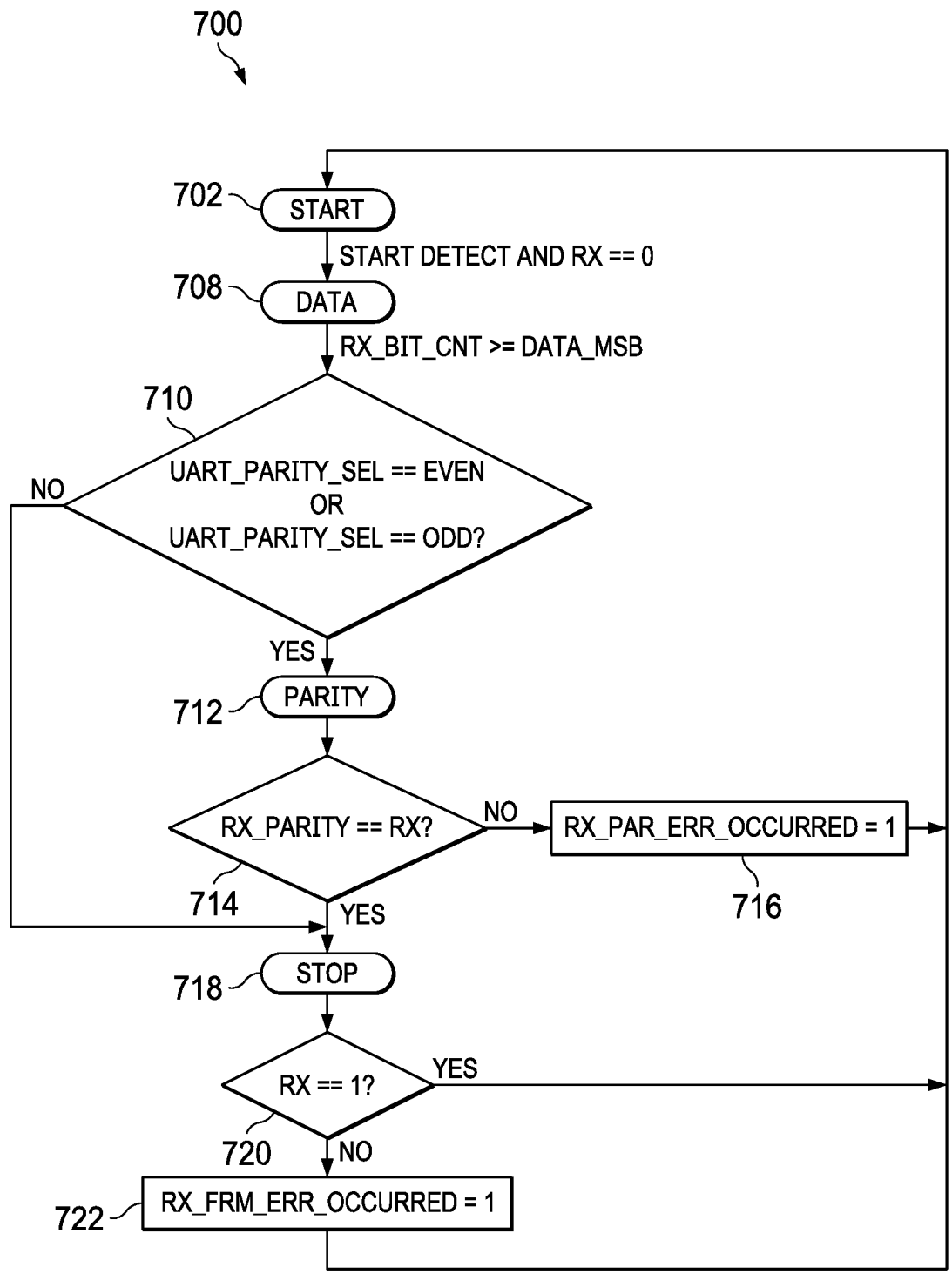
FIG. 7 is a state machine for a UART receiver in accordance with various examples.

FIG. 7 is a state machine 700 for a UART receiver (e.g., the UART receiver 124 in FIG. 1) in accordance with various examples. As shown, the state machine 700 includes state 702, which corresponds to a start state. From state 702, the state machine 700 transitions to state 708 when a START detect signal and a receive signal (RX) are equal to zero, where state 708 corresponds to a data state. The state machine 700 stays in state 708 until a receive bit count signal (RX_BIT_CNT) is greater than or equal to a most significant bit of data (DATA_MSB). If an even or odd UART parity bit is used (determination block 710), the state machine 700 transitions to state 712 to receive the parity bit. If a parity bit is not used (determination block 710), the state machine 700 transitions to state 718, which corresponds to a stop state. The state machine 700 also transitions to state 718 if a receiver parity check signal (RX_PARITY) is equal to RX (determination block 714). Otherwise, if RX_PARITY does not equal RX (determination block 714), a receiver parity error signal is asserted (RX_PAR_ERR_OCCURRED=1), and the state machine 700 returns to state 702. While in state 718, if RX=1 (determination block 720), the state machine 700 returns to state 702. While in state 718, if RX does not equal 1 (determination block 720), a receiver firmware error signal (RX_FRM_ERR_OCCURRED=1) is asserted and the state machine 700 returns to state 702. For the state machine 700, an NCO overflow signal (e.g., nco_ovrfl in FIG. 5) is the clock that drives the state machine 700.

Figure 8:
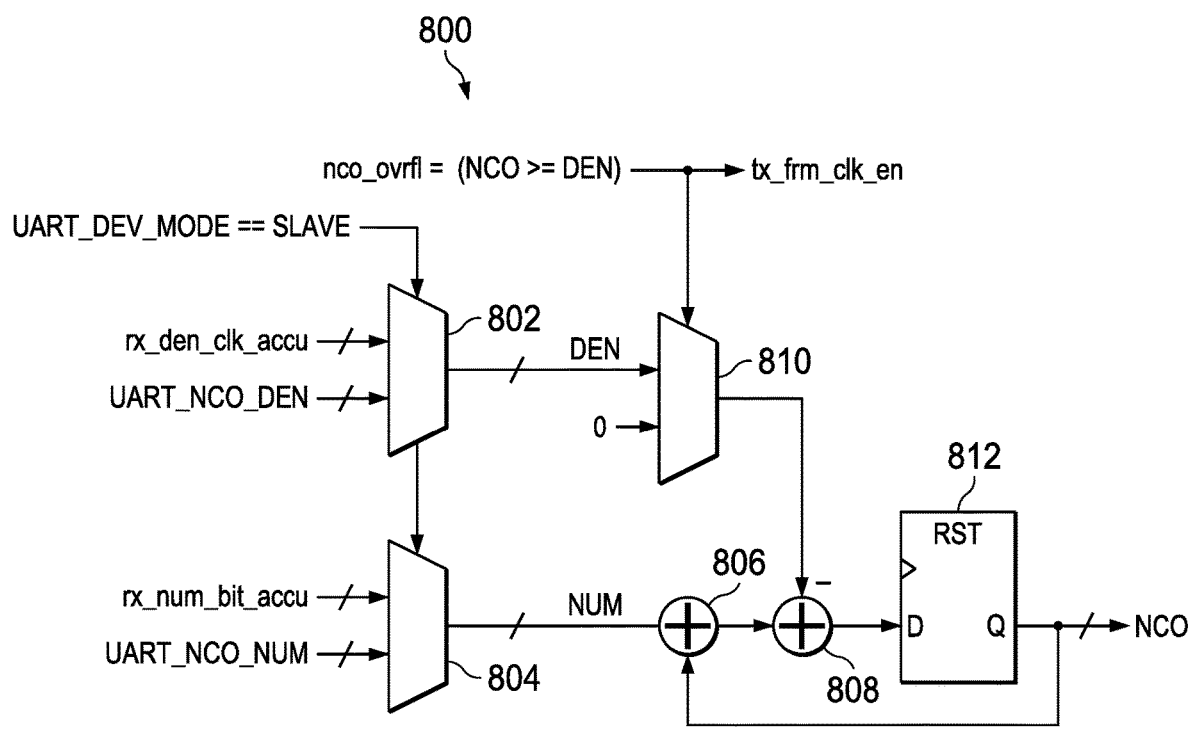
FIG. 8 is a schematic diagram showing an NCO circuit for a UART transmitter in accordance with various examples.

FIG. 8 is a schematic diagram showing an NCO circuit 800 for a UART transmitter in accordance with various examples. As shown, the NCO circuit 800 includes a first multiplexer 802 and a second multiplexer 804. The first multiplexer 802 receives as inputs: 1) a UART NCO den signal (UART_NCO_DEN), which is a programmable start value used by a clock count circuit (e.g., a multiplexer could be added to the clock count circuit 400 to pass UART_NCO_DEN to the D latch 414 in FIG. 4); and 2) a receiver accumulated clock count signal (rx_den_clk_accu), where accum_clks in FIGS. 4 and 5 is an example of rx_den_clk_accu in FIG. 8. Meanwhile, the second multiplexer 804 receives as inputs: 1) a UART NCO number signal (UART_NCO_NUM), which is a programmable start value used by a bit count circuit (e.g., a multiplexer could be added to the bit count circuit 300 to pass UART_NCO_NUM to the D latch 314 in FIG. 3); and 2) a receiver accumulated bit count signal (rx_num_bit_accu) where accum_bits in FIGS. 3 and 5 is an example of rx_num_bit_accu in FIG. 8. When a UART device mode signal (UART_DEV_MODE) is set to a slave state, the output of the first multiplexer 802 is rx_den_clk_ammu and the output of the second multiplexer 804 is rx_num_bit_accu. In other words, the NCO circuit 800 uses the accumulated clock count and the accumulated bit count provided by the UART receiver (e.g., the UART receiver 124) when the UART transmitter is in a slave state. Otherwise, if the UART_DEV_MODE is not set to a slave stage, the output of the first multiplexer 802 is UART_NCO_DEN and the output of the second multiplexer 804 is UART_NCO_NUM.

As shown, the NCO circuit 800 also includes another multiplexer 810 coupled to an output (DEN) of the first multiplexer 802. As shown, the multiplexer 810 receives a null value ("0") and DEN as selectable values, where the control signal for the multiplexer 810 is nco_ovfl (NCO>32 DEN). Thus, when nco_ovfl is asserted, DEN is selected as the output of the multiplexer 810. Otherwise, the null value is selected as the output of the multiplexer 810.

The output of the multiplexer 810 is input to a combine circuit 808. As shown, the combine circuit 808 also receives the output of another combine circuit 806 as an input. More specifically, the combine circuit 806 adds the output (NUM) of the multiplexer 804 with the NCO value output by the NCO circuit 800. Also, the combine circuit 808 subtracts the output from the multiplexer 810 from the output of the combine circuit 806. The output of the combine circuit 808 is input to a D latch 812, and the output of the D latch 812 in the NCO value for the NCO circuit 800.

Figure 9:
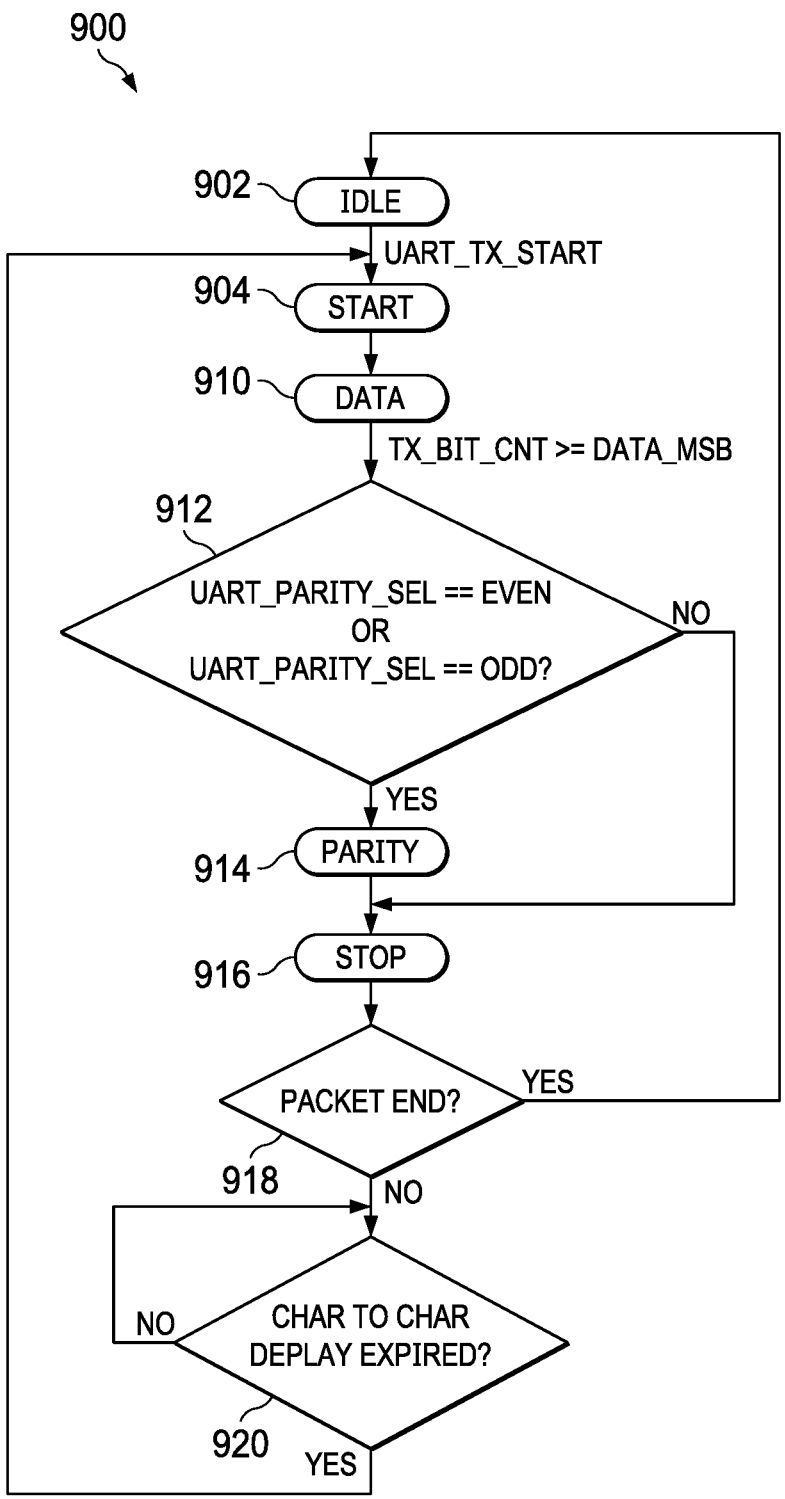
FIG. 9 is a state machine for a UART transmitter in accordance with various examples.

FIG. 9 is a state machine 900 for a UART transmitter (e.g., the UART transmitter 140 in FIG. 1) in accordance with various examples. As shown, the state machine 900 includes state 902, which corresponds to an idle state. From state 902, the state machine 900 transitions to state 904 when a UART transmit start signal (UART_TX_START) is received, where state 904 corresponds to a start state. The state machine 900 transitions from state 904 to state 910, which corresponds data state. The state machine 900 stays in state 910 until a transmit bit count signal (TX_BIT_CNT) is greater than or equal to a most significant bit of data (DATA_MSB). If an even or odd UART parity bit is used (determination block 912), the state machine 900 transitions to state 914 to transmit the parity bit. If a parity bit is not used (determination block 912), the state machine 900 transitions to state 916, which corresponds to a stop state. The state machine 900 also transitions to state 916 once the parity bit is transmitted. If a packet is ended (determination block 918), the state machine 900 transitions from state 916 to state 902. Otherwise, if a packet is not ended (determination block 918) and a character to character delay is not expired (determination block 920), the state machine 900 waits until the character to character delay is expired to transition to the state 904. For the state machine 900, an NCO overflow signal (e.g., nco_ovrfl in FIG. 8) is the clock that drives the state machine 900.

The disclosed UART device topologies include adaptive sample timing using an NCO circuit. The NCO circuit tracks the TX/RX frequency error using a training algorithm but without needing a specific pre-defined training pattern. The RX tracking circuit also can be used to adjust for the fact that baud rate and system clock are not multiple of 2/integer related. A simple serial-to-parallel (S2P) interface can be used along with this tracking circuit to provide a UART RX that can track frequency error and can adjust to any baud rate to system clock fraction. The use of a numerically controlled oscillator in the UART RX is novel. Also, the use of falling edge to falling edge for non-zero training data takes out rise/fall time differences from being a source of error. The proposed solution is valuable as it provides a low cost, simple way to track frequency error without needing to speed up the sampled clock or other large circuitry. The proposed solution allows for any system clock to baud rate relationship to be supported in the UART RX.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A system, comprising:
    a monitoring circuit, the monitoring circuit including:
    a sense circuit; and
    a peripheral device coupled to the sense circuit, the peripheral device including:
    a universal asynchronous receiver-transmitter (UART) receiver having an adaptive sample timing circuit that includes a clock count circuit determining an accumulated clock count, a bit count circuit determining an accumulated bit count, and a numerically-controlled oscillator (NCO) circuit having an input coupled to the accumulated clock count and an input coupled to the accumulated bit counts; and
    memory coupled to the UART receiver and configured to store data.

2. The system of claim 1, in which the data includes a status value based on measurements obtained by the sense circuit.

3. The system of claim 1, in which the data includes measurement values obtained by the sense circuit.

4. The system of claim 1, in which the bit count circuit includes:
    a first set of components tracking a bit count relative to a data edge; and
    a second set of components adding a bit count from the first set of components to an accumulated bit count, the second set of components dividing the accumulated bit count in response to an edge detect signal along with an accumulated bit overflow condition or an accumulated clock overflow condition.

5. The system of claim 4, in which the first set of components includes at least one multiplexer and a D latch.

6. The system of claim 1, in which the clock count circuit includes:
    a first set of components tracking a clock count relative to a data edge; and
    a second set of components adding the clock count from the first set of components to an accumulated clock count, the second set of components dividing the accumulated clock count in response to an edge detect signal along with an accumulated bit overflow condition or an accumulated clock overflow condition.

7. The system of claim 6, in which the second set of components determines a next accumulated clock count, and the NCO circuit receives the next accumulated clock count as an input.

8. The system of claim 1, including a master device coupled to the peripheral device via a UART link, and wherein the NCO circuit is trained based on unpatterned clock edges.

9. The system of claim 1, in which the UART receiver of the peripheral device provides the accumulated clock count and the accumulated bit count to a UART transmitter of the peripheral device.

10. The system of claim 9, in which the UART receiver is a first UART receiver, the adaptive sample timing circuit is a first adaptive sample timing circuit, and the memory is a first memory, and including a master device that includes:
    a second UART receiver having a second adaptive sample timing circuit with an NCO; and
    a second memory coupled to the second UART receiver for storing data.

11. The system of claim 10, in which the UART receiver of the peripheral device provides the accumulated clock count and the accumulated bit count to a UART receiver of a master device coupled to the peripheral device via a UART link.

12. A universal asynchronous receiver-transmitter (UART) receiver, comprising:
    a numerically-controlled oscillator (NCO) circuit;
    a clock count circuit coupled to a first input of the NCO circuit; and
    a bit count circuit coupled to a second input of the NCO circuit, an output of the NCO circuit determines a sample time for the UART receiver.

13. The UART receiver of claim 12, in which the NCO circuit determines the sample time based on an accumulated bit count obtained from the bit count circuit and based on an accumulated clock count obtained from the clock count circuit.

14. The UART receiver of claim 13, in which the NCO circuit additionally determines the sample time based on a next accumulated clock count, an NCO overflow condition value, and an edge detect signal.

15. The UART receiver of claim 12, in which the bit count circuit includes:
    a first set of components tracking a bit count relative to a data edge; and
    a second set of components adding the bit count from the first set of components to an accumulated bit count, the second set of components dividing the accumulated bit count in response to an edge detect signal along with an accumulated bit overflow condition or an accumulated clock overflow condition.

16. The UART receiver of claim 12, wherein in which the clock count circuit includes:
    a first set of components tracking a clock count relative to a data edge; and
    a second set of components adding the clock count from the first set of components to an accumulated clock count, the second set of components dividing the accumulated clock count in response to an edge detect signal along with an accumulated bit overflow condition or an accumulated clock overflow condition.

17. The UART receiver of claim 12, in which the UART receiver is part of a battery monitoring circuit.

18. An integrated circuit, comprising:
    a universal asynchronous receiver-transmitter (UART) transmitter; a UART receiver; and
    memory coupled to the UART transmitter and the UART receiver, in which the UART receiver includes:
    a numerically-controlled oscillator (NCO) circuit changing a sample time for the UART receiver responsive to an accumulated clock count value and an accumulated bit count value.

19. The integrated circuit of claim 18, in which the UART receiver includes a clock count circuit determining an accumulated clock count value, the clock count circuit using a divided accumulated clock count value in response to an edge detect signal along with an accumulated bit overflow condition or an accumulated clock overflow condition.

20. The integrated circuit of claim 18, in which the UART receiver includes a bit count circuit determining an accumulated bit count value, the bit count circuit using a divided accumulated bit count value in response to an edge detect signal along with accumulated bit overflow condition or an accumulated clock overflow condition.

21. The integrated circuit of claim 18, in which the NCO circuit adjusts the sample time responsive to the accumulated clock count value, the accumulated bit count value, a next accumulated clock count, an NCO overflow condition value, and an edge detect signal.

\* \* \* \* \*